United States Patent
Backman et al.

(10) Patent No.: US 6,684,293 B1
(45) Date of Patent: Jan. 27, 2004

(54) METHODS AND COMPUTER READABLE MEDIA FOR PRESERVING UNIQUE CRITICAL INFORMATION DURING DATA IMAGING

(75) Inventors: Drake A. Backman, Orem, UT (US); Peter D. Bartok, Mapleton, UT (US); Nitu Choudhary, Orem, UT (US); Matthew E. Lewis, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/892,082

(22) Filed: Jun. 26, 2001

Related U.S. Application Data

(63) Continuation of application No. 09/818,030, filed on Mar. 27, 2001, now abandoned.

(51) Int. Cl.$^7$ ............................................. G06F 12/14
(52) U.S. Cl. ................... 711/111; 711/161; 711/162; 711/163; 711/173; 713/200; 713/182
(58) Field of Search .................... 711/111, 173, 711/163, 162, 161; 713/182, 200

(56) References Cited

U.S. PATENT DOCUMENTS

| | | | |
|---|---|---|---|
| 5,790,773 A | 8/1998 | DeKoning et al. .............. 714/6 |
| 5,828,831 A | * 10/1998 | Kong .......................... 709/229 |
| 5,968,174 A | * 10/1999 | Hughes ....................... 713/100 |
| 6,061,770 A | 5/2000 | Franklin ...................... 711/162 |
| 6,092,169 A | * 7/2000 | Murthy et al. ................ 361/685 |
| 6,167,494 A | 12/2000 | Cheston et al. .............. 711/162 |
| 6,173,376 B1 | 1/2001 | Fowler et al. ................ 711/162 |
| 6,178,520 B1 | * 1/2001 | DeKoning et al. ........... 711/114 |
| 6,195,695 B1 | 2/2001 | Cheston et al. .............. 709/221 |
| 6,212,635 B1 | * 4/2001 | Reardon ....................... 380/30 |
| 6,282,621 B1 | * 8/2001 | Parsons ....................... 707/206 |
| 6,480,944 B2 | * 11/2002 | Bradshaw et al. .......... 711/162 |

* cited by examiner

Primary Examiner—Gary Portka
Assistant Examiner—Jasmine Song
(74) Attorney, Agent, or Firm—Dinsmore & Shohl LLP

(57) ABSTRACT

Methods and a computer readable medium are provided for preserving unique critical information during the data imaging process. A method of augmenting the image process is provided wherein information necessary to properly operate one or more network applications, uniquely identify a computing device on the network, or to fulfill any other similar role is acquired. The information is from time to time stored in locations of the storage device which are not partitioned or otherwise used by the computing device.

Further, a computer readable medium is provided wherein one or more locations are partitioned and available for use without any significant restrictions.

Additionally, a method of restoring a memory associated with a computing device connected to a network of additional computing devices is provided. Also, critical information is acquired from time to time, and the data including the identifying information are restored upon a request.

18 Claims, 2 Drawing Sheets

METHODS AND COMPUTER READABLE MEDIA FOR PRESERVING UNIQUE CRITICAL INFORMATION DURING DATA IMAGING

This application is a continuation and claims priority from pending U.S. application Ser. No. 09/818,030 filed on Mar. 27, 2001, now abandoned the disclosure of which is incorporated herein by reference.

FIELD OF THE INVENTION

The present invention relates to methods and computer readable media for preserving unique critical information during data imaging.

BACKGROUND OF THE INVENTION

Providing backup data to a hard drive of a computing device is of vital importance in today's information age. Individuals have become so dependent upon using their computing device, that they have become non functional when the device is inoperable. When a computing device starts up, or is booted up, it uses a hard drive memory associated with the computing device to provide all the necessary data files and data application programs to the user of the device. Some of these files may reside locally on the computing device, while others are provided remotely to the computing device if the computing device is networked with other devices providing files and applications.

A standard process, referred to as hard drive imaging, allows the user to take a snapshot of a hard drive which includes all data included therein and store these data in an image archive. This image archive can be stored off onto additional computer readable media, such as and by way of example only, CDs, diskettes, additional hard drives, and other magnetic or optical storage devices. The image archive can later be used to restore the original computer (and/or any other reasonably compatible device) to the state in which it existed at the time the image archive was created.

During the imaging process all information is captured exactly and precisely. Should a failure occur with a user's hard drive on the original computer or on a compatible device, the image archive can be used to place all data contained on the original device at the time the image archive onto the current device. This process effectively places the device into the exact state that existed on the original device at the time the image archive was created. Unfortunately, the state duplication is too exact for some applications and network functions.

Some applications and network functions require that certain information be unique among all devices attached to the same network as the current device. For example, TCP/IP networking requires that all addresses on a network be unique. Other networking applications require that each device have a unique name. Yet other applications may require that certain data be the same on a certain administrator-defined group of devices, yet different from all other defined groups.

The results for failing to set these values correctly after an image archive has been restored to the device vary from application to application. Some cause the network components of the device to function incorrectly, or to shut down, resulting in the complete loss of access to the network. Others may results in the user receiving different security access privileges than intended. Results are almost impossible to predict and vary greatly from application to application, but all result in the need for a manual reconfiguration of the device after the image archive has been restored.

Quite often, a device needs to be restored using a different image archive or a similar image having modified identifying information, because some catastrophic event has occurred to make it inoperable. Prior to that event, however, this device would have had valid values for all data requiring any degree of uniqueness. Unfortunately, these values are irretrievably lost during the hard drive imaging process using the different or similar image archive.

SUMMARY OF THE INVENTION

Accordingly, an object of the invention is to provide methods and computer readable media to preserve unique critical information during the imaging process and to restore it after the image process has completed. This information is referred to collectively as image-safe data and includes, but is not limited to static IP addresses, workgroup/role identifying information, file permissions, and the like. Using the image archive and the image-safe data a computing device may be effectively restored to a fully functional state, should its main memory (e.g. hard drive) crash, or otherwise become corrupted.

This image-safe data may be stored directly on non-partitioned and unused areas of the hard drive of a user's computing device, with the typical image archive stored on removable or remote computer readable media. In this way, a user may restore a computer device to a fully functional state using the image safe data recorded on the unusable portions of the hard drive (e.g., non-partitioned areas) and the image archive stored on the removable computer readable media.

Should a hard drive failure occur, even a user not currently connected to the network could be restored to a fully functional state by using the removable media as a boot device. This would then permit the user to reformat the computing device's hard drive and restore all information properly, including the image safe data. With the image safe data, the user may then successfully connect to a network and identify itself properly or acquire the appropriate programs based on the user's defined work groups, roles, file permissions, and the like.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims. To achieve the foregoing and other objects and in accordance with the purpose of the present invention, methods and computer readable media are provided for preserving critical information during an imaging process.

A method of augmenting the imaging process of a computer device's memory is provided, comprising the executable instructions of acquiring information necessary to properly operate one or more network applications or uniquely identify the computing device to a network of additional computing devices. Further, from time to time the information is acquired in one or more storage locations of the computing device, wherein the locations are not partitioned or otherwise used by the computing device.

In another aspect of the present invention, a computer readable medium is provided, having one or more usable locations wherein the usable locations are operable to be partitioned and used without any significant restrictions. Moreover, one or more reserved locations are used to house information necessary to properly operate one or more network applications or uniquely identify a specific computing device. The reserved locations may not be partitioned and are only accessed by authorized applications.

In yet another aspect of the present invention, a method of restoring a memory associated with a computing device connected to a network of computing devices is provided, having executable instructions wherein from time to time data associated with a memory of a computing device is acquired. Furthermore, from time to time one or more non-partitioned memory locations identifying information which uniquely identifies the computing device is acquired. Upon a request, the data and the identifying information are restored.

Still other aspects of the present invention will become apparent to those skilled in the art from the following description of an exemplary embodiment, which is by way of illustration, one of the exemplary modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

DETAILED DESCRIPTION

Figure 1:
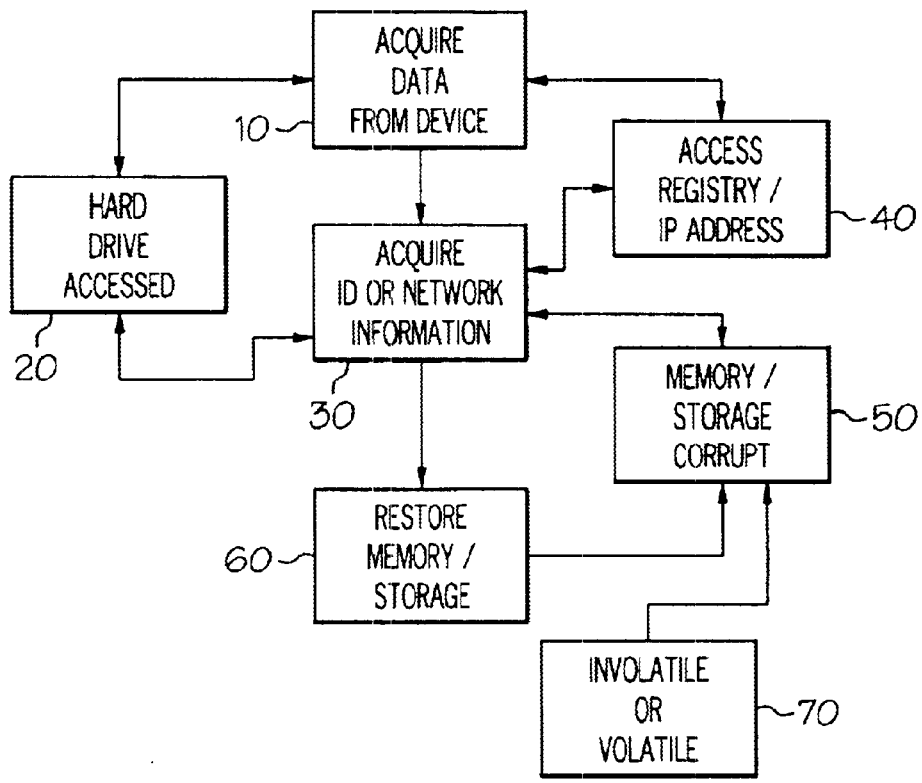
FIG. 1 depicts a flow diagram of a method for augmenting the imaging process of a computing device's memory.

The present invention provides methods and computer readable media for preserving unique critical information during a data imaging process. One embodiment of the present invention is implemented in NOVELL's ZENworks for Desktops product using the C or C++ programming language. Of course other products and programming languages (now known or hereafter developed) may also readily employed.

The image archive containing hard drive data may be stored on a network disk drive, or on an external media such as a CD, diskette, tapes, ZIP magnetic drives, and the like. Although as one skilled in the art will appreciate, the image may be stored on any computer readable media such as optical, magnetic, and the like. Moreover, the image archive need not reside on a single computer readable medium, rather, several computer readable media may include the data having a single image of a hard drive.

Further, as previously presented some information associated with the image data, such as image-safe data, may actually be stored or retained on the hard drive which is being imaged, as will be set forth below. Additionally, a hard drive does not have to be internal to a computing device, it may be external, or it may be virtual, as with the case of application service providers and data warehouse portals.

Furthermore, a computing device is any device capable or processing executable instructions, such as and by way of example only, personal computers, super computers, mainframe computers, mid-range workstation computers, GPS systems, car computing devices, hand held devices (e.g., Personal Digital Assistants), computing peripheral devices (e.g., MP3 players, printers, scanners, faxes, copiers, CD-RW, ZIP drives, electronic books, electronic gaming devices, and others), mobile telecommunication devices (e.g., wireless phones), intelligent appliances, intelligent apparel (e.g., watches), and the like.

During a typical imaging process where the hard drive memory associated with a computing device is backed up for the purpose of recovery or replication, the drive is read and the data stored on some backup computer readable media. This backup computer readable media may be an external media or a remote media, such as a network storage device when the computing device is in communication with a second computing device while creating the image archive of the hard drive's contents.

Moreover, even if the hard drive itself becomes corrupt or is damaged in some way, it is still often useable once it has been reformatted. As one skilled in the art will appreciate, when a hard drive is reformatted, any data previously residing in the partitioned areas of the hard drive are permanently lost, or become otherwise unrecoverable. However, after the hard disk is reformatted it may be used again, this eliminates the need to swap internal hard drives out of computing devices, although this may need to occur should a hard drive not be capable of being reformatted.

As will also be apparent to those skilled in the art, there exist a number of a data types which are typically housed in the registry or other configuration files of a computing device that provide certain necessary configuration, identifying or other types of information that are associated with the device's position within the network and/or organization.

TCP/IP configuration information, for example, permits a computing device to communicate on a network by providing identifying information regarding the computing device. Hard drive imaging processes overwrite this information with values that may not be valid for the current computing device. This may occur as by way of example only, when a computing devices identifying information has changed since it was last imaged, or when a different image not originally taken from the computing device is being restored on the computing device.

As a result, when a computing device's hard drive fails or needs to be otherwise replicated to another computing device, an external manually kept data file somewhere contains this information regarding the failed computing device's hard drive, and it is either manually restored or restored using utilities which permit the computing device, with a new hard drive or reformatted hard drive, to interface and work properly once re-imaged.

In an exemplary embodiment of the present invention, the typical imaging process of a hard drive is altered such that image-safe data are recorded and stored either remotely, on external media, or on the hard drive of the computing device itself which is being imaged. However, if the image safe-data are recorded on the hard drive which is being imaged, then the data must be placed in an area of the hard drive which will not be corrupted or erased on failure, user mistake or during the actual imaging process itself.

To do this, sectors of the hard drive which are not partitioned and not written to are utilized. By way of example only, consider sector 6 of a magnetic hard drive, which by definition cannot be part of any viable partition, and is typically not used by any software applications. This area may be used, or other areas similar to sector 6, to house image safe data.

In this way, should a failure with a hard drive occur the typical image archive data may be restored to the hard drive and the computing device becomes immediately usable since the image-safe date (e.g., the IP address, work groups/roles, file permissions, and the like) may be read from the protected area of the hard drive and restored in the registry or configuration files of the computing device upon startup.

Of course the image-safe data may also be stored on the external media or remote media having the image data. The ability to recreate the image-safe data immediately provides a remote user the opportunity to reconnect to the user's network remotely and instantly be recognized and be fully operational without manual intervention from a network administrator. Alternatively, as one skilled in the art will readily appreciate this provides the opportunity to recreate an entire computing device's environment on a second computing device, or to mass replicate certain image safe data, such as workgroup/roles and permissions to one or more computing devices without the need for manual intervention to ensure unique network identification information.

FIG. 1 depicts a flow diagram of a method for augmenting the imaging process of a computing device's memory. Initially in step 10 data are acquired from the memory associated with a computing device, such as and by way of example only a hard drive associated with a computing device. Standard data acquired during the image process are acquired by accessing the memory of the computing device in step 20, image safe data occurring in the registry or the configuration files of the computing device are acquired in step 40.

Image-safe data, such as the IP address of the computing device and/or other network information, are acquired in step 30. Other network information, which may include permission and access levels to specified applications, or licensing information related to applications, and the like. Again, this information may be obtained from the computing device's memory, from the registry, or other configuration files of the computing device.

The image-safe data, such as the IP address of the computing device, the network information, work groups/roles, file permissions, and the like, may then be alternatively written to the non partitioned, non usable areas of the computing device's hard drive. In this way the image-safe data may be acquired should a restore be requested, by accessing the hard drive's protected areas (e.g., sector 6), as presented above.

At some later point in time, the data and image safe data may need to be restored, such as when the memory of the computing device becomes unusable or corrupt as depicted in step 50. The data and the image-safe data may be restored to the volatile or non-volatile memory (step 70). As one skilled in the art will readily appreciate, non-volatile memory remains persistent during power outages, shutdowns of the computing device and the like, whereas the volatile memory is associated with RAM and is lost during power outages or shutdowns of the computing device.

The memory is restored in step 60 using the data and the image-safe data without any manual intervention. In this way a remote user having performed a backup of the user's computing device's hard drive onto an external media, such as a CD, may reboot with the CD and become completely operational with his computing device and any network to which the user needs to communicate, without the need to contact any network administrator for assistance in resolving an IP address, network permissions, file permissions, work groups/roles, and the like.

As one skilled in the art will readily recognize, this is particularly useful if the user's image-safe data has changed since a user's most recent image, or if the user is using an image from a different computing device altogether. It will be readily apparent to those skilled in the art, that whenever image-safe data on a computing device are modified, this is a readily recognizable event and a set of executable instructions running as a background process on the computing device, will easily recognize the modification and be capable of updating the non partitioned/non useable areas of the user's hard drive to reflect such modifications.

In this way, even if identifying information is modified since the latest image taken by the user, taken by an application program, or taken by a network administrator, as the case may be, the user's identifying information is safely retrievable on startup from the areas on the hard drive of the computing device which are protected and which were used to record the identifying information as it was modified. This prevents manual intervention and substantially automates the imaging process, since image safe data frequently may change between images and since user's are often given canned images from different computing devices.

Figure 2:
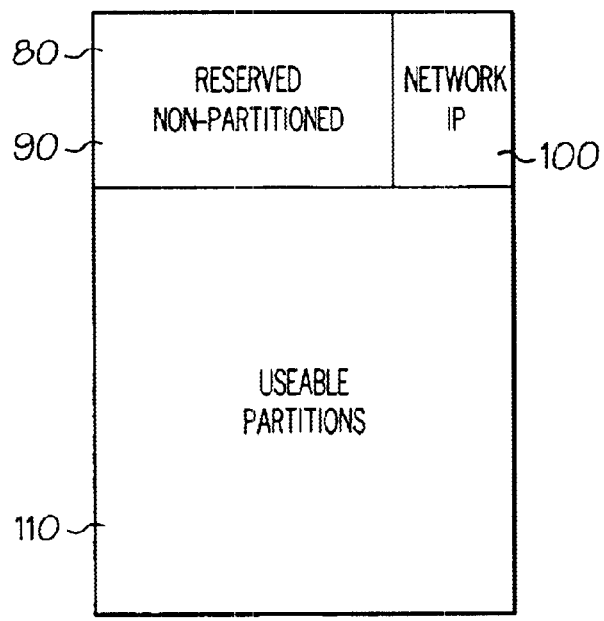
FIG. 2 depicts a schematic of a computer readable medium.

FIG. 2 depicts a schematic of a computer readable medium. The computer readable medium 80 includes one or more usable locations 110 operable to be partitioned and used by the applications of a computing device without any significant restrictions. Further, the medium 80 includes one or more reserved locations 90 which are not partitioned and are only usable by authorized applications of the computing device permitting write access to these non partitioned 90 areas.

The non partitioned areas 90 of the medium 80 include network and IP address information 100, such that when an image is taken of the medium 80, the network and IP address information 100 are written to the reserved non partitioned areas 90. In this way, should a failure or a corruption occur with the usable partitions 110, these usable areas may be reformatted and restored using the unaffected reserved area 90 along with the restoration data taken during the image process.

The medium 80 may be the hard drive of a computing device, it may be a logical partitioned area accessed remotely, or an external medium which is operable to be interfaced with a computing device, such as a CD, diskette, external hard drive, ZIP drive, or any other external optical or magnetic drive.

Moreover, although the medium 80 is depicted as a single medium, it may actually be logically constructed from a variety of other memory locations and assembled to provide the medium 80 depicted in FIG. 2, as needed.

Figure 3:
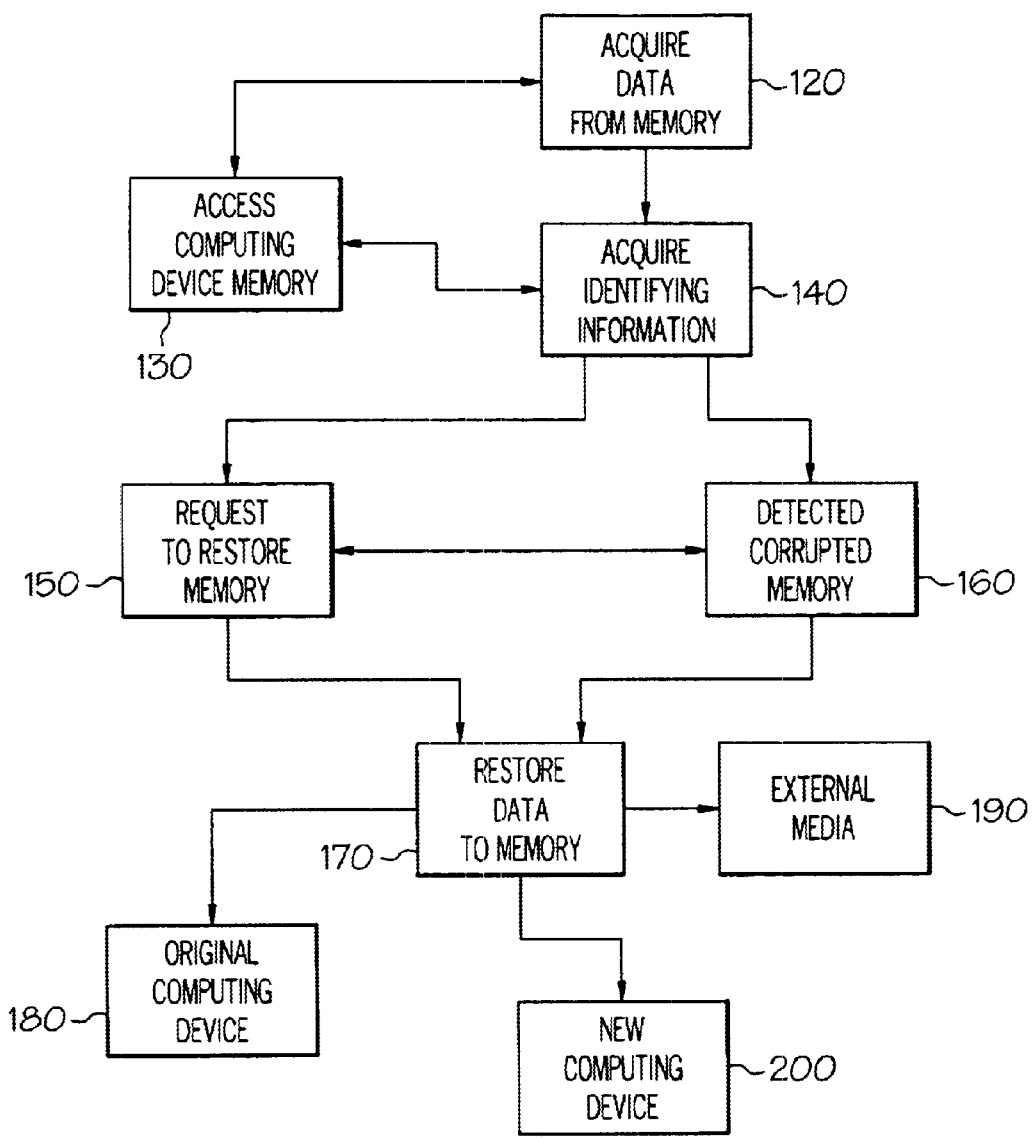
FIG. 3 depicts a flow diagram of a method of restoring a memory.

FIG. 3 depicts a flow diagram of a method of restoring a memory. Data associated with the memory of a computing device are acquired from time to time in step 120. These data may be acquired automatically by automated processes executing at set times/dates, manually by selection of a user or system administrator, or upon detection by automated processes that some type of failure is likely to occur. In this way acquisition of data associated with the memory may occur in a variety of ways.

In step 140 identifying information which uniquely identifies a computing device and the data associated therewith is acquired. Acquisition of identifying information will occur when data are acquired from the memory of a computing device (e.g., step 120), this step may be fully automatic, although as one skilled in the art will readily appreciate it need not be automatic and may be manual if desired.

Further, a set of executable instructions executing remotely or resident to a user's computing device may detect any user modifications to identifying information, and upon detection record this information either remotely or on non partitioned/non usable areas of the user's hard drive associated with the user's computing device. As one skilled in the art will appreciate, non useable does not literally mean the area cannot be used, only that an authorized set of executable instructions may access this area, which would prevent corruption in the vast majority of corruption scenarios.

To acquire the data associated with the memory of the computing device and the concomitant identifying information, a computing device's memory is accessed in step 130. Once the data associated with the memory of the computing device and the identifying information are acquired, a complete restore of the acquired data and identifying information may occur upon a request in step 150.

A request may occur manually, such as when a user inserts and boots up the user's computing device with an external computer readable medium having the data and maybe the identifying information, or it may occur automatically when an application detects corrupted memory such as depicted in step 160. Although, as previously presented the identifying information may actually reside on the hard drive of the user's computing device since it is stored in a location that is not likely to ever become corrupt and may be reused (e.g., non partitioned areas of the hard drive).

In step 170, the data are restored along with the identifying information. Furthermore, restoration may occur to an external media as depicted in step 190, to the user's original computing device as depicted in step 180, or to a second or new computing device in step 200.

The foregoing description of an exemplary embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the attached claims.

What is claimed:

1. A method of augmenting the imaging process of a computing device's memory, comprising the executable instructions of:
   acquiring from a computing device identifying information necessary to uniquely identify a computing device to a network of additional computing devices, wherein the identifying information comprises a name configured to identify the unique position of the computing device within the network;
   acquiring from time to time the identifying information in one or more storage locations of the computing device, the locations being non-partitioned and unused by the computing device; and
   using the identifying information to restore a memory of the computing device after the computing device's memory becomes inoperable, such that the computing device may be identified within the network and may operate within the network as it did prior to the restoration.

2. The method of claim 1, wherein the information includes one or more registry entries in the computing device's operating system.

3. The method of claim 1, wherein the one or more storage locations are located on is a hard drive.

4. The method of claim 3, wherein the information is stored on a first portion of the hard drive which cannot belong to a valid partition.

5. The method of claim 1, wherein the one or more storage locations are non-volatile or volatile.

6. A system comprising:
   a computer readable medium including:
      one or more useable locations which are operable to be partitioned and used without any significant restrictions; and
      one or more reserved locations used to house identifying information which uniquely identifies the position of a computing device within a network or organization, wherein the reserved locations may not be partitioned and may only be accessed by authorized applications, and wherein the reserved locations are configured to be accessed by an authorized restoration application during a restoration process following a failure of the computer readable medium; and
   a restoration computing device programmed with the authorized restoration application,
   wherein the authorized restoration application is programmed to:
      acquire from time to time data associated with the computer readable medium;
      acquire from time to time on the one or more reserved locations the identifying information which uniquely identifies the position of the computing device within a network or organization; and
      restore the data including the identifying information upon a restoration request by accessing the one or more reserved locations and obtaining the identifying information in response to the request.

7. The system of claim 6, wherein the useable locations are operable to be restored by the restoration computing device upon a failure by using the information in the reserved locations.

8. The system of claim 6, wherein the useable and reserved locations combine to form a hard drive of a computing device.

9. The system of claim 6, wherein the medium is removable storage associated with a computing device.

10. The system of claim 6, wherein the medium is operable to be imaged remotely.

11. The medium system of claim 6, wherein at least a portion of the identifying information includes an Internet Protocol address of a computing device.

12. The system of claim 11, wherein the Internet Protocol address may be readily assigned to a new computing device if the computing device to which it was originally associated fails.

13. A method of restoring a memory associated with a computing device connected to a network of computing devices, comprising the executable instructions of:
   acquiring from time to time data associated with a memory of a computing device;
   acquiring from time to time on one or more non-partitioned memory locations identifying information which uniquely identifies the computing device and associates the computing device with the memory, wherein the non-partitioned memory locations are only accessible by authorized applications; and
   restoring the data including the identifying information upon a restoration request by accessing the one or more non-partitioned memory locations and obtaining the identifying information in response to the request.

14. The method of claim 13, wherein the restoring step occurs on the computing device after the memory becomes corrupted.

15. The method of claim 13, wherein the acquiring steps are performed by executable instructions residing on a remote computing device while in communication with the computing device.

16. The method of claim 13, wherein the data and the identifying information are stored on external computer readable media.

17. The method of claim 13, wherein the restoring step occurs on a second computing device different from the computing device.

18. The method of claim 13, wherein the request occurs automatically upon a detected failure in the memory and once the computing device is in communication with a remote computing device having access to the data and the identifying information.

* * * * *